US005659637A

United States Patent [19]

Bagley, Jr. et al.

[11] Patent Number: 5,659,637

[45] Date of Patent: Aug. 19, 1997

[54] VANDER LUGT OPTICAL CORRELATOR ON A PRINTED CIRCUIT BOARD

[75] Inventors: Harold R. Bagley, Jr., Lafayette, Colo.; Jeffrey A. Sloan, Costa Mesa; Donald W. Small, Lake Forest, both of Calif.

[73] Assignee: Optical Corporation of America, Garden Grove, Calif.

[21] Appl. No.: 667,275

[22] Filed: Jun. 20, 1996

Related U.S. Application Data

[63] Continuation of Ser. No. 249,820, May 26, 1994, abandoned.

[51] Int. Cl.$^6$ .......... G06K 9/00

[52] U.S. Cl. .......... 382/278; 382/280

[58] Field of Search .......... 382/210, 211, 382/213, 278, 276, 280; 359/561, 559

[56] References Cited

U.S. PATENT DOCUMENTS

| | | | |
|---|---|---|---|
| 4,588,260 | 5/1986 | Horner | 350/162.13 |
| 4,715,683 | 12/1987 | Gregory et al. | 358/345 |
| 5,073,006 | 12/1991 | Horner et al. | 382/278 |
| 5,101,270 | 3/1992 | Boone et al. | 382/278 |
| 5,148,496 | 9/1992 | Anderson | 382/278 |
| 5,150,228 | 9/1992 | Liu et al. | 359/561 |
| 5,282,067 | 1/1994 | Liu | 359/561 |
| 5,418,380 | 5/1995 | Simon et al. | 250/550 |

OTHER PUBLICATIONS

Knopp "Optical calculation of correlation filters" SPIE vol. 1295 1990 pp. 68–75.

Barnes et al "Optoelectronic determination of binary phase only filters for optical correlation"Optical Engineering 1992 pp. 1936–1945.

Ross, "Miniature Ruggedized Optical Correlator Optimized for Space" LEOS 1991 pp. 1–18.

*Primary Examiner*—Yon J. Couso
*Attorney, Agent, or Firm*—Joseph R. Dwyer

[57] ABSTRACT

A Vander Lugt optical correlator adapted to be mounted on a printed circuit board or other mounting means usable with or in a personal computer utilizing a monochromatic coherent polarized light source, a folded optical path with optics that perform light beam collimation and Fourier transformations, SLMs for scene and filter inputs and a CCD detector array at the correlation plane. The module may be of any selected configuration, such as, a parallelopiped, or a disc, either of which may be hollow, of solid opaque material for light paths formed therein, of a transparent media without passages, or of multiple sections for packaging shape, light path length compensation, component mounting etc. The circuit board may contain electronics required to operate all of the correlators electronic components.

15 Claims, 10 Drawing Sheets

VANDER LUGT OPTICAL CORRELATOR ON A PRINTED CIRCUIT BOARD

This application is continuation, of application Ser. No. 08/249,820, filed May 26, 1994, now abandoned.

BACKGROUND OF THE INVENTION

1. Field of Invention

This invention relates, in general, to optical processing and to an improvement in Vander Lugt optical correlators. This invention offers significant cost benefits thus allowing an affordable commercial-type product for the first time.

This invention relates particularly to the miniaturization of Vander Lugt optical correlators and more specifically to provide users of personal computers (PCs) with optical processing capabilities. This invention miniaturizes optical correlators to a point where they may be used with or form part of PCs. More specifically, these miniaturized optical correlators are capable of being mounted on plug-in printed circuit boards, or on other mounting means, for desktop PCs of any make or model or capable of being mounted on printed circuit boards, or on other mounting means, for optional external equipment connectable through the ports of desktop or laptop PCs of any make or model.

In addition to their use in or with PCs, miniaturization of optical correlators in accordance with this invention expands their use for other applications as will be apparent from the following description and accompanying drawings.

2. Prior Art

Vander Lugt optical correlators rely on "matched filtering" to accomplish target (object) recognition. Optical correlators recognize objects in a scene by comparing them to a filter, encoded in a hologram. When a match occurs, the correlation shows up as a focused spot of light on an otherwise black background. The location of the spot also corresponds to the location of the object in the scene. Portions of the scene that bear no resemblance to the encoded reference object are filtered out and appear black. Thus, the output of a correlator is a map of values representing the likelihood that an object, or group of features, in the scene at a particular location, is the one of interest, ie, the target.

An optical correlator typically comprises, as shown at 10 in FIG. 1, a first lens $L_1$, a Fourier transform lens, one focal length from the object plane (scene) 11. A Fourier plane (filter) 12 located one focal length behind the first lens $L_1$ is optically coupled to a second Fourier transform lens $L_2$ and the resulting image (correlation) plane 13 is located at the Fourier transform plane of the second lens. Not counting the laser's collimation optics, this is a four focal length, or "4f", system.

Originally, the optical correlator was tailored to a particular application for a particular object or target to be recognized because the filter, such as 12, was specifically designed for that purpose and could not be conveniently changed. However, recent developments in Spatial Light Modulators (SLMs), which alter the properties of a light beam as a function of position across that light beam can function as a programmable and updatable filter allowing a single optical correlator design to meet a number of applications.

FIG. 2 shows a generalized optical correlator 20 utilizing two SLMs 21 and 22 which may or may not be identical. The first input SLM 21 functions to insert an input signal (scene) from an acquisition sensor 23 (not normally considered part of a correlator as indicated by the dashed lines in FIG. 2) into the optical train so that it can be processed. The second SLM 22 functions as a filter which can be updated, or reprogrammed, repeatedly if necessary, according to the object to be recognized. This filter SLM 22 corresponds to the filter 12 in FIG. 1 and the two lens assemblies 24 and 25 in this figure correspond to the two lenses $L_1$ and $L_2$ in FIG. 1. The detector (a charged coupled device) CCD 26, located at the image plane, corresponds to the correlation plane 13 in FIG. 1. The output of the CCD 26 is processed in postprocessing electronics 27 according to the information desired.

SLMs are selected according to the type of information being processed and the desired characteristics of the optical processor. There are many types of SLMs; a partial list of which includes Liquid Crystal Televisions (LCTVs), Ferroelectric crystals (FLCs), Holographic optical elements (HOEs), and Acousto-Optic (AO) cells. For this invention, the SLMs selected have relatively small pixels (≈30 um pitch) and are reflective. (The SLMs illustrated in FIGS. 1–3 are transmissive). SLMs are devices that modulate a light beam via a separate input signal. These inputs are of two types: optical and electrical. Optical conversion devices (Optically Addressed SLMs) convert an input scene from an external light path to the correlator's laser path by affecting the optical activity of subregions of the device. These devices may be analog (one large single active cell, or pixellated). Electrically addressable devices (EASLMs) use a separate electrical signal (ie, video) to modulate the correlator's laser path by affecting the optical activity of pixels in the modulator.

The input scene contains objects to be recognized, such as a product, a vehicle, or objects in a TV scene, or any 2-dimensional data, to be presented to the correlator 20. The acquisition sensor 23 begins the transference of this real scene to an input image for the correlator at input SLM 21. For example, if an external video system is used, the video signal is then fed into a frame grabber where a computer may preprocess the imagery at video rates, or faster if the SLMs can operate beyond 30 Hz, and this modified video signal is fed into the input SLM 21 in non-interlaced form and allowed to interact with the correlator's laser beam.

FIG. 3 illustrates more clearly what constitutes the acquisition sensor 23 in relationship to the first input SLM 21. Acquisition sensor 23 includes a CCD or equivalent camera 28 with a suitable trigger and perhaps timing signals for the SLM drive electronics 29 so that any view on scene 11 is electronically transferred to the SLM 21. In this case, the SLM is electronically addressable (such as an LCTV) and not optically addressable (such as a light valve). Scene 11 may be staged, or comprise real activities, indoor or outdoors, day or night (if suitable illumination is provided to create a detectable image by camera 28). Polarized light from a monochromatic source (such as a laser diode) 30 is directed through a collimator lens 31 to illuminate the input SLM 21, and is then Fourier transformed by lens 24. It passes through the filter SLM 22 (an electronic holographic optical element), and is Fourier transformed a second time by lens 25, and falls on detector array 26. The output of the detector array is then sent to the postprocessor electronics **27*a*. The output of the postprocessor 27*a* may then be returned into the system's main processor 27*b*, which includes an operator program 27*c* to run the entire system and a filter generator program 27*d* to generate and change the filter images in filter SLM 22 and a memory 27*e*. (Items 27*a–e* are collectively referred to as postprocessing electronics 27 in FIG. 2.) The operator program and any changes therein and the filter images generated by the filter generator program and any changes may be saved in memory along with the output from the detector array 26. The postprocessor 27a may be contained in the PC. Suitable system synchronization and timing control electronics 32 and drive electronics 33 for the light source 30** are also provided.

Also, while optical correlators were originally restricted to the laboratory because of the extremely stringent alignment requirements, more recently the packaging of the optics into small rugged mounts and the use of other technology, such as folding the light path, compact lens systems, etc, allows miniaturization of optical correlators into stable, reliable and compact units. One such miniaturized correlator using a photographic hologram is only 780 $cm^3$.

Still more recently, an optical correlator utilized a beamsplitter in a solid block prism assembly to direct the scene's Fourier transform into two filter planes. LCTV technology was used for both its scene and filter SLMs and both were electronically addressed, independently programmable, and operate in an amplitude or phase mode which enabled the use of a variety of types of filters. Both sets of correlations were detected by two CCD cameras simultaneously. Folding the optical path reduced the size of these optics from over 20,000 $cm^3$ to about 4900 $cm^3$. [The size of this second system is larger due to the fact that its SLM's resolution elements (pixels) are significantly larger than that of holographic film. The optical path's scale is the square of this dimension.]

Thus far, hardware design has been directed toward reducing the size of optical correlators using the above mentioned optical or electronically addressed SLMs, folded optical paths, laser diodes, CCDs, etc, but no attempt has been made heretofor to miniaturize optical correlators so as to be capable of being mounted on, and formed part of, printed circuit boards to give PC operators optical processing capabilities whether the optical correlator are mounted in the PCs themselves or part of optional external equipment connected to the PCs.

SUMMARY OF THE INVENTION

Thus, a primary object of this invention is to miniaturize optical correlators of the Vander Lugt type.

A second object of this invention is to provide a user of a PC with optical processing capability.

Still another object of this invention is to provide a miniaturized optical correlator mounted on a standard commercial size printed circuit board which is capable of being plugged into the PC or on any other mounting means to be used with or in a PC.

The optical correlator which accomplishes the foregoing objects comprises a module with selected optical elements adapted to be mounted on a printed circuit board or other mounting means usable with or in a PC. This optical correlator module utilizes a monochromatic light source such as a laser diode, a folded optical path with optics that perform light beam collimation and Fourier transformations, SLMs for scene and filter inputs, and a CCD detector array at the correlation plane.

The module may be of any selected configuration, such as a parallelopiped, or a disc, either of which may be hollow, or of solid opaque material with passages for the light path formed therein, or of transparent media without passages, or of multiple sections to allow for packaging shape, light path length compensation, folding, component mounting, etc.

The circuit board contains electronics required to operate all of the correlator's electronic devices and while the electronics of the printed circuit board may vary, the printed circuit board as disclosed herein contains the laser diode drive electronics, CCD drive electronics, synchronization and timing electronics, electronically addressed SLM drivers and Video RAM, as well as preprocessor and postprocessor video electronics and necessary electrical contacts and ribbon cables.

DETAILED DESCRIPTION

Figure 1:
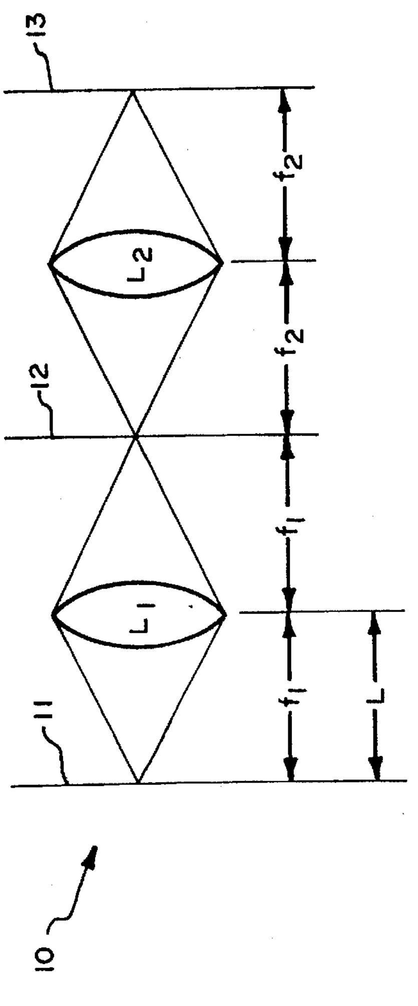
Fig. 1. (PRIOR ART)
FIG. 1 is a schematic illustration of an optical correlator as previously described.
Figure 2:
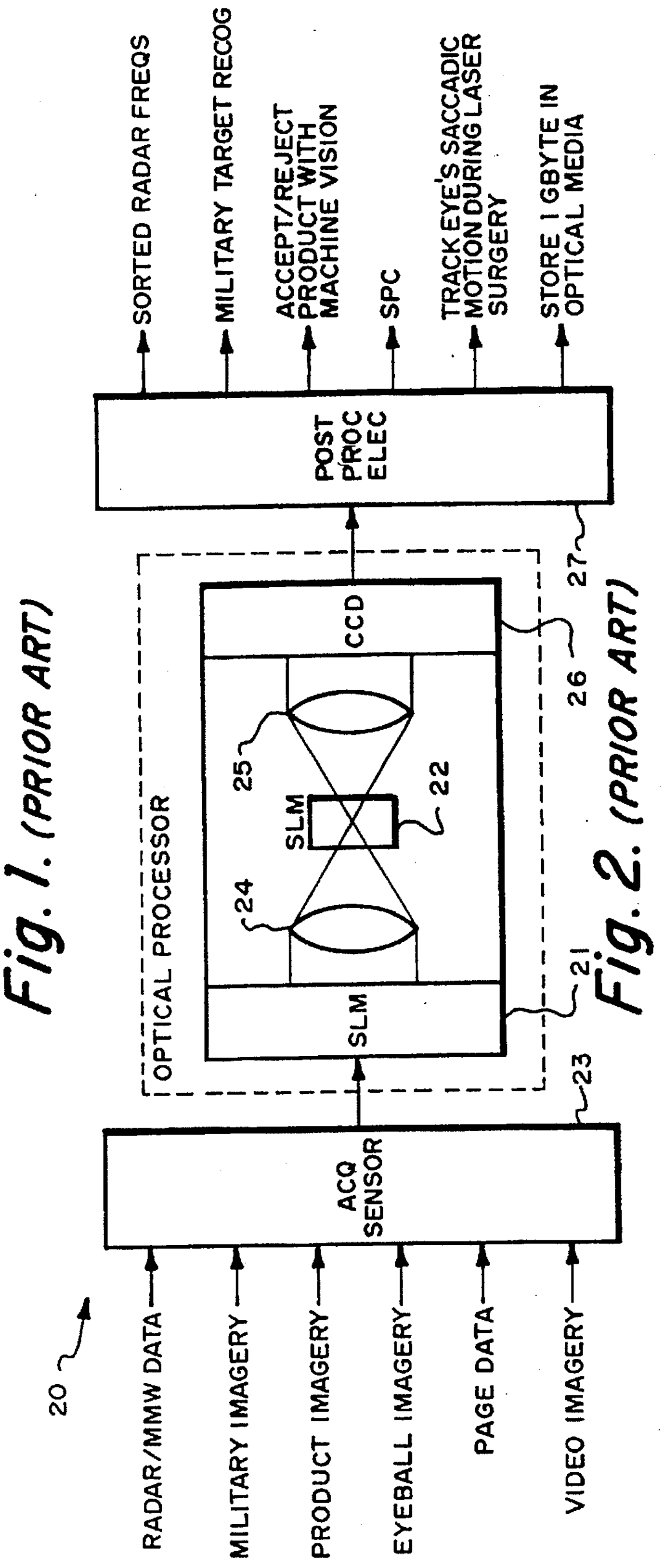
Fig. 2. (PRIOR ART)
FIG. 2 is a schematic illustration of a more advanced and generalized optical correlator utilizing SLMs as previously described, FIG. 3 more clearly illustrates the use of the optical correlator of FIG. 2.
Figure 3:
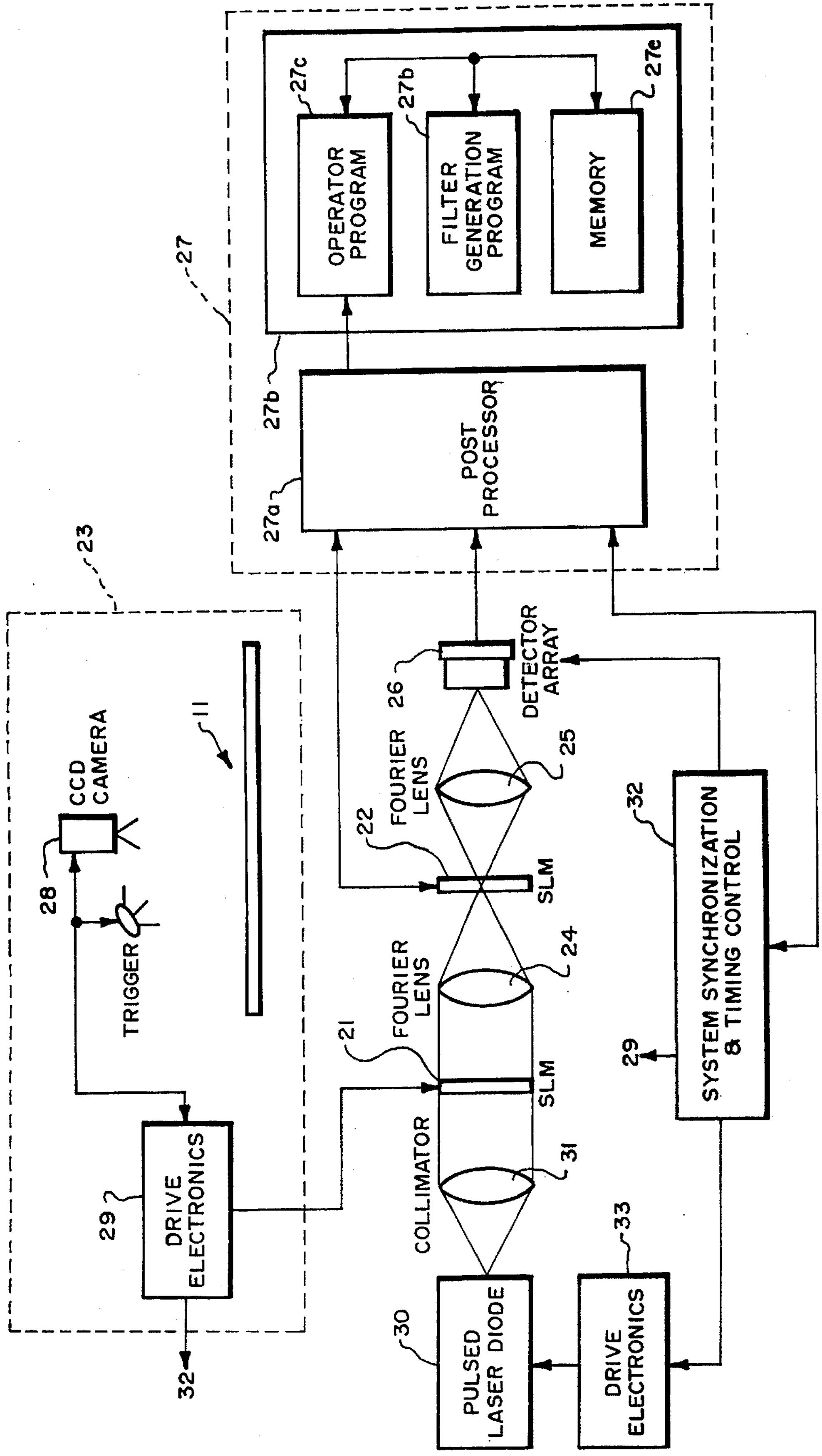
Fig. 3. (PRIOR ART)

Since FIGS. 1, 2 and 3 were previously described in the Background, no further description of these figures is deemed necessary.

Figures 4, 5, 6:
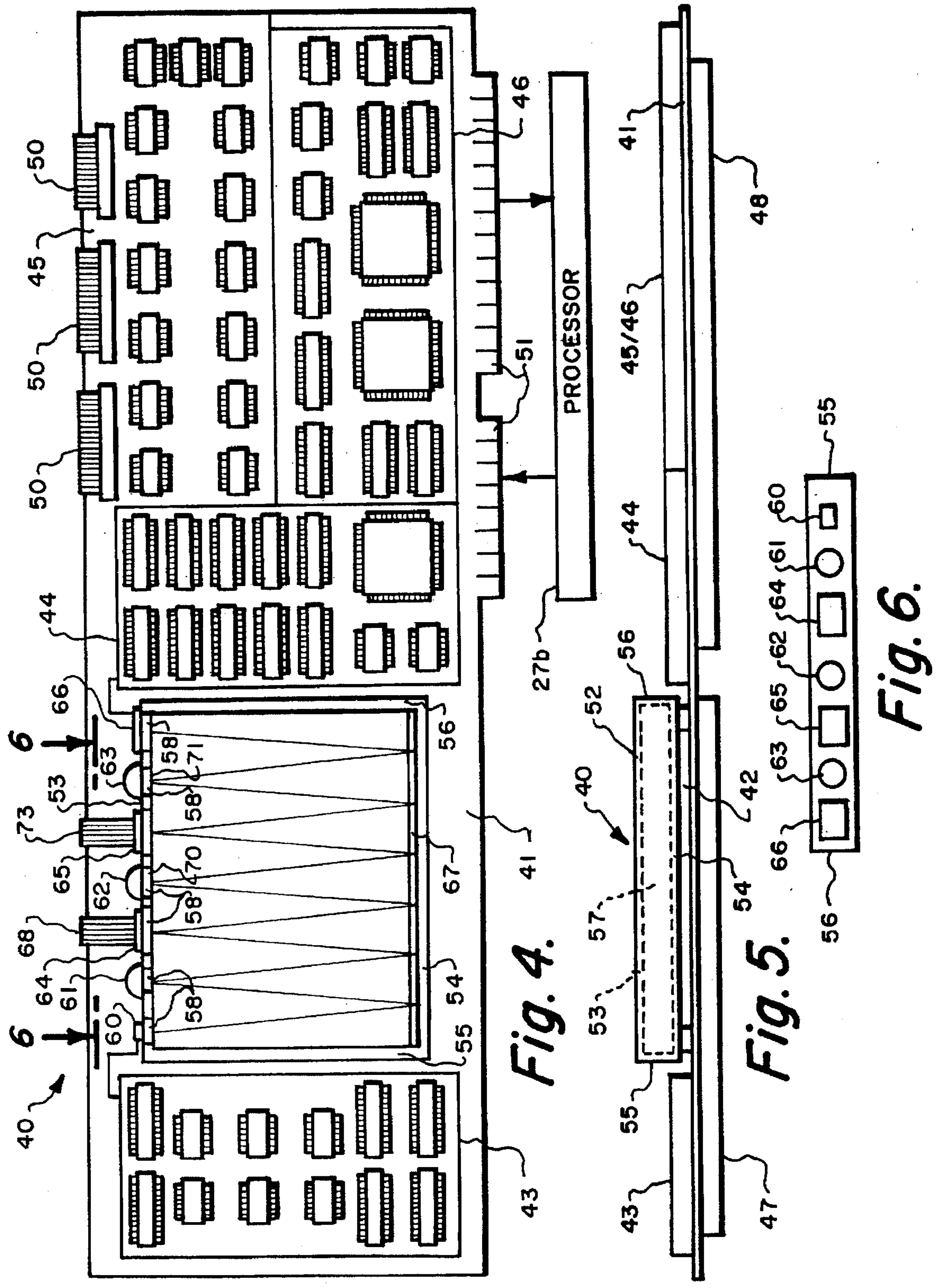
FIG. 4 is a plan view of an example of a correlator shown in the form of a hollow parallelopiped on a PC comparable printed circuit board for the purpose of disclosing the various components of the correlator and its folded optical path.
FIG. 5 is a side view of the correlator and PC board of FIG. 4.
FIG. 6 is a view of one side of the correlator, taken along line 6—6 of FIG. 4.

In FIGS. 4, 5 and 6, there is shown an optical correlator 40 of the Vander Lugt type mounted on a standard commercial size plug-in printed circuit board 41 with support electronics. The placement of the correlator 40 on the printed circuit board 41 will depend only on the normal constraints faced by a printed circuit board designer.

The correlator of FIG. 4 is schematic and exemplary to show what is important about this invention, ie, that the correlator 40 is mountable in any suitable manner on a printed circuit board, and to show how its optical components interrelate to fold the optical path. Other embodiments, later shown and described, show variations of the correlator.

It is understood that the support electronics on the printed circuit board may vary considerably from that shown and that future versions of the printed circuit board may use a hybrid chip for the support electronics. It is possible that any or all of the support electronics may be located within the PC leading only the correlator 40 on the printed circuit board 41 to be connected to the PC by suitable cables. FIG. 5 also shows a space or gap 42 between the correlator 40 and the printed circuit board 41 which would allow that area to be used for support electronics if needed. This gap 42 arises due to the mounting constraints for some devices as well as providing thermal isolation and convective flow-through around the correlator.

In this depiction of the invention, correlator 40 is shown mounted between laser diode electronics 43 and CCD drive electronics 44. All other electronics are located either on one side or the other of the PC board 41. Thus, Digital Interface electronics 45, Sync/Timing electronics 46 are on the same side as the correlator 40 while the EASLMs Driver electronics and Video Ram 47 and Postprocessor electronics for peak value and its X and Y coordinates are located on the other side of the printed circuit board 41. The Digital Interface electronics 45 allows the input scene and filter SLMs to write their electronic arrays at 30 Hz rates or faster. All necessary ribbon cables 50 to interconnect the electronics and the PC are provided. The printed circuit board also contains conventional sliding contacts 51 for Video-In, Postprocessor for peak value and its X and Y coordinates. These contacts 51 connect the printed circuit board to the electronics in the PC.

The optical correlator 40 comprises module 52 in the form of a hollow parallelopiped with two long narrow top and bottom sides 53 and 54 and two short narrow sides 55 and 56 (see FIG. 5). These sides form a light tight enclosure 57 for the light beam. Top side 53 is provided with suitable apertures 58 which open into the enclosure 57 to accomodate a laser diode 60, three concave mirrors 61,62 and 63 which have identical optical curvatures and whose inner cavities open into the enclosure 57, and two electronically addressed EASLMs 64 and 65. Mirror 61 is located between the laser diode 60 and the input or scene EASLM 64, mirror 62 is located between the first EASLM 64 and the second or filter EASLM 65, while the third mirror 63 is located between EASLM 65 and a detector 66, a CCD or equivalent. Optics 61,62 and 63 need not be identical but can be made so to reduce cost.

To form the folded optical path within the enclosure 57, a long planar reflecting mirror 67 is positioned on the inner side of the long side 54 facing side 53 and within the enclosure 57 so that the coherent linearly polarized light emitted from the laser diode 60 is first directed to the mirror 67 and then reflected back to the first mirror 61 which collimates the beam and reflects the same back onto mirror 67. This mirror returns the beam to the first input scene EASLM 64. This EASLM, as mentioned before, is electronically controlled by the PC. This EASLM 64 reflects this beam, now containing scene information, back to mirror 67 where it is reflected back through a linear polarizing filter 70 oriented perpendicular to the polarization axis of the source (thus converting the optical effect of the scene SLM to one based on intensity). The light continues on to the second mirror 62 which functions as a Fourier transform optic. The reflected beam again transits the polarizing filter 70 (which now only attenuates the beam) and allows the resulting beam to reach the mirror 67. This resulting beam is then directed to the second EASLM 65, which acts as a binarized matched spatial filter. The optical effect of EASLM 65 is to add an incremental phase difference to the light reflecting off of one of the two types of pixels (state "on" for instance), thus generating a second (and different) polarization vector for that light. (Ideally this phase difference is one-half of a wavelength of light, or a delay of $\pi/2$ or 180°. In practice this is rarely achieved, thus the requirement for a second polarizing filter 71 to accomplish this.) Thus, the filtered beam is reflected back to the mirror 67 where it is reflected back to the second binarizing polarizing filter 71, oriented to split the light into two opposing polarities, thence to the third mirror 63. This mirror 63 functions as a second Fourier transform optic and converts the inner action between the live Fourier transform and the filter into a correlation function, transits to the second linear polarizing filter again, and directs the transformed beam back to the mirror 67 where it is directed to the CCD detector 66. The electrical signal produced in the CCD detector is processed by the postprocessing electronics 44.

Laser diode 60, mirrors 61,62 and 63, EASLMs 64 and 65 and CCD array 66 correspond, respectively, to the laser diode 30, collimater 31, lenses 24 and 25, SLMs 21 and 22, and detector 26 in the correlator of FIG. 3 except that these EASLMs are reflective. Also as in FIG. 3, but not shown in FIG. 4, the acquisition sensor 23 is located external to the PC. It may connect to a scene frame grabber board in the same PC, (or if a suitable acquisition sensor that automatically digitizes the video signal itself is used, it may connect directly to the video RAM for the scene SLM via the high speed parallel interface). The scene frame grabber board is also connected to the scene video RAM via the high speed parallel interface (cable not shown on the far side of the printed circuit board), which in turn is connected to the SLM by cable 68. A bank of video RAMs on the PC board acts like the equivalent filter frame grabber, and is connected to the filter EASLM 65 drive electronics (cable not shown). The filter EASLM is connected to its drive electronics by cable 73.

Figure 7:
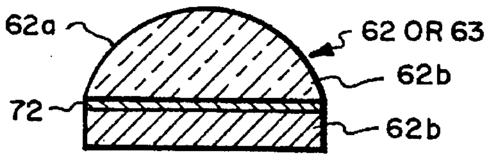
FIG. 7 illustrates one form of a mirror formed of bulk material from a linear polarizing filter.

As mentioned previously, the two identical mirrors 62 and 63 perform a Fourier and inverse Fourier transform function while identical mirror 61 is used as a collimator lens. These mirrors may be molded, replicated or conventionally configured. They may be first or second surface mirrors (ie, the optical curve may be formed on the rear surface of a bulk material including the material used in a linear polarizing filter). See FIG. 7 where one mirror 62*a* is formed from the bulk material 62*b* with the linearly polarizing material 72 sandwiched therebetween.

An exemplary specification for these conventional mirrors is shown in appendix A attached hereto.

As shown in FIG. 4, the polarizers 70 and 71 are located directly in front of mirrors 62 and 63. These polarizers may instead be located in the light path reflected from the mirrors 62 and 63 as at mirror 67. Additionally, if the rear surfaces of these polarizers are made reflective, they may act as mirror 67 themselves.

As an alternative, equivalent lenses or Diffractive Optical Elements (DOEs) may be substituted in part, or in total, or in combination, for the curved mirrors. Alternative layouts may have the light source, SLMs, and the CCD on multiple sides of the module, which itself need not be rectangular in shape. For example, the laser diode, both SLMs, and the detector may be positioned on one side of the module, such as the top side as in FIG. 4 with the lenses 61,62 and 63 being positioned on the opposite side of the module with the latter performing collimating and Fourier transform functions as well as acting as discrete mirrors. The two polarizers are located in the light path as described above.

To reduce the size of the optical correlator from that of the prior art so that the correlator becomes mountable on the printed circuit board, this invention takes advantage of recent advances in SLMs and CCDs and folding the light path.

The length of the folded light path for a true Vander Lugt correlator must include the equivalent of four focal lengths between the input SLM and the CCD detector. These lengths are determined by the size of the pixel of the SLMs, the size of the pixel array, and the wavelength of the light. The formula for determining the focal lengths is as follows:

$$L=\frac{P^2\cdot N}{\lambda}$$

where L is the focal length of the Fourier transform optics, (L is shown in FIG. 1)

P is the spacing of the pixels, i.e. pitch,

N is the number of pixels along an edge, and

λ is the wavelength of the light from the laser diode,

Both SLMs have equal pixel sizes and arrays.

It is apparent that the focal lengths vary with the square of the pixel size and taking the selected pixel size as ≈30 μm and the number of pixels as 128 and the wavelength as 685 nm, the length of each of the four focal lengths becomes ≈168 mm. The module 52 of FIG. 4 having a pixel size of ≈30 μm is approximately 4"×3.5"×0.5" (including externally mounted components) with four such focal lengths. It is also apparent that further advances in the SLM and CCD technology may reduce the size of the correlator even further as will be explained in connection with later described figures.

EASLMs having a pixel size of ≈30 um are available as P/N DRO128B from Display Technologies, Boulder, Colo. While these devices are currently binary (having only two operating optical states), future devices may allow for more than two states and could be substituted into the system.

CCDs of the type used in this correlator are available from Dalsa, Inc P/N IA-D1-0128.

For a more compact system, the requirement for four focal lengths can be relaxed to one of shorter geometry by spacing the scene SLM closer to the first Fourier transform lens and moving the second Fourier transform lens and CCD closer to the filter SLM. This introduces a quadratic phase error, but since the detector array responds only to intensity, correlations can still be detected without loss of system performance. This eliminates approximately two focal lengths of optical path in the system, resulting in a "2f" system that is more compact than the correlator shown in FIG. 4. By passing through the second Fourier transform lens twice, the design of the system's optics changes slightly. In this case, new focal lengths are required to preserve scale factors at the scene SLM and the CCD, or a third optic may be inserted in the light path in front of the CCD, in which case the optics may be made with identical focal lengths.

Rigidity and stability are still other factors to be considered and these depend on varying temperature ranges commensurate to the ranges expected by the printed circuit board designer. Aluminum, machinable ceramic, glass as one transparent media, or Zerodur have been found to be acceptable. Other materials may prove suitable, too.

Figure 8:
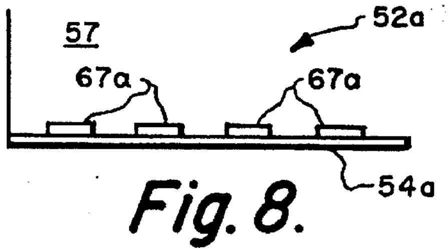
FIG. 8 illustrates discrete reflecting mirrors for the module of FIG. 4.

FIG. 8 shows the bottom side 54*a* of module 52*a* with discrete mirrors 67*a* in place of the single mirror 67 of FIG. 4. While these mirrors 67*a* are shown facing the enclosure 57, they may be located on the outside of the module 52*a* with suitable apertures, such as 58, (not shown) opening into the enclosure 57.

In FIG. 8 and in all of the following figures those components which function the same as similar components in the prior figure will be given the same reference numerals or suffixes a, b, c, etc. as the case may be to simplify the description herein.

Figure 9:
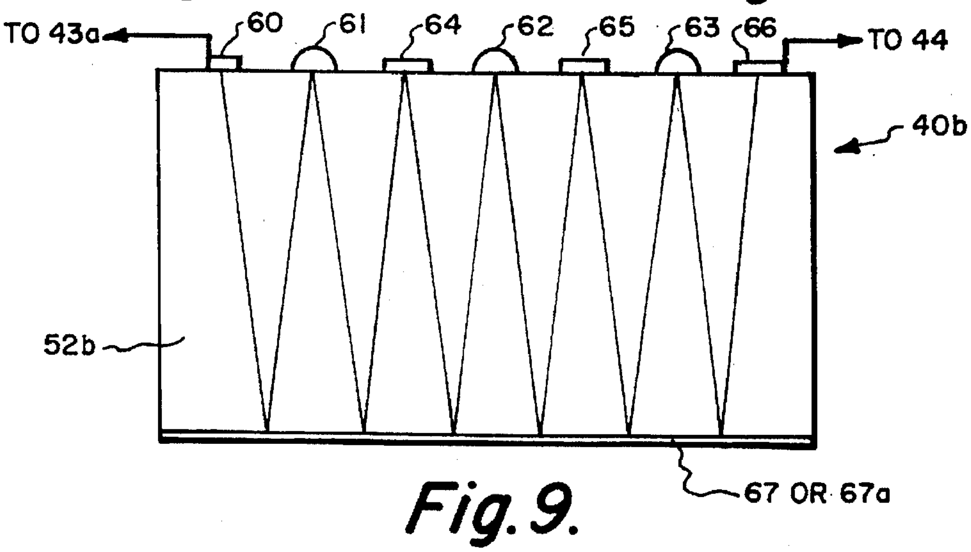
FIG. 9 is a plan view of another embodiment of the module formed of a solid block of transparent media and showing the various components of the correlator and how the module accomodates the folded optical path.

FIG. 9 shows a correlator 40*b* with a module 52*b* made of a transparent media, such as glass, with the components 60–66 located on the top side of the module as in FIG. 4. Mirror 67, or mirrors 67*a*, as the case may be, are suitably located on the bottom side of the module. The operation of this correlator is the same as that described in connection with the correlator of FIG. 4.

Figure 10:
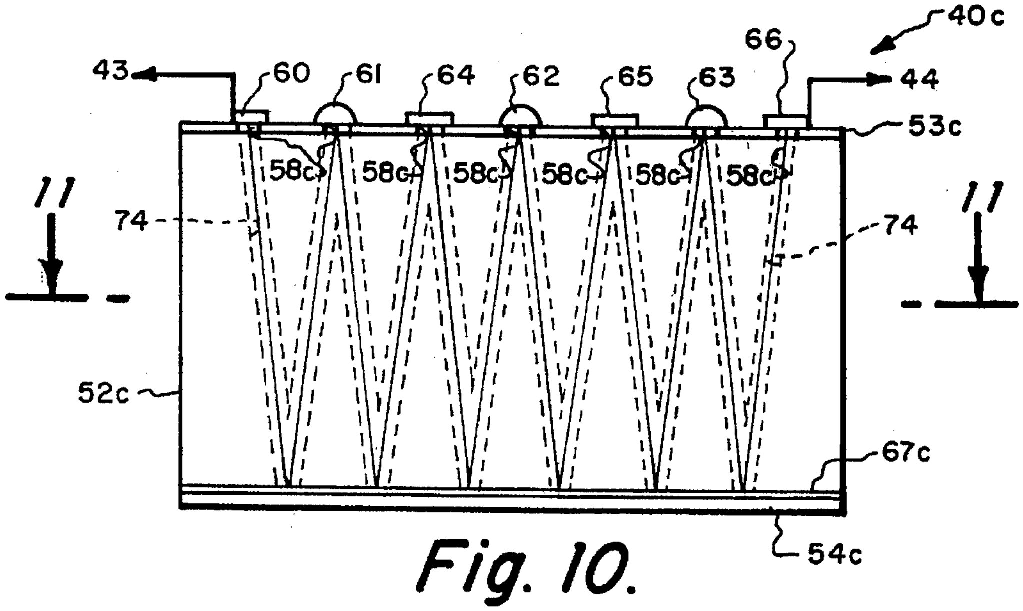
FIG. 10 is a plan view of another embodiment of the module formed in a solid block of opaque material and showing the various components of the correlator and how the module is formed to accomodate the folded optical path.

FIG. 10 shows another embodiment of a correlator 40*c* where the module 52*c* is formed of a solid block of opaque material. This solid module 52*c* has a top plate 53*c* containing apertures 58*c* and a bottom plate 54*c* supporting reflecting means 67*c* as in FIG. 4. Both plates 53*c* and 54*c* are suitably attached to the solid block of material to form a complete module. This figure depicts a similar folded light path as that in the prior figures except that the enclosure 57 has been replaced through the plurality of enclosure means in the form of passages 74 coaxial with the light beam formed angularly within the solid material and which terminate at or near the plates 53*c* and 54*c* to enable the light beam to be directed back and forth through these passages 74. The passage's widths must be at least slightly larger than the optical beam and not reflect or scatter light into the working area. While these passages are shown circular in cross-section, they may have other cross-sectional configurations such as square. This solid block module 52*c* provides additional rigidity to the correlator where such rigidity is necessary.

Figure 11:
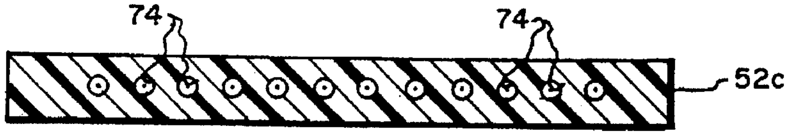
FIG. 11 is a cross-sectional view taken along line 11—11 of FIG. 10.

While FIGS. 10 and 11 show a solid block with passages 74, there are other possibilities. The solid block may be formed in matching halves with one half of each passage formed in each half or the passages may be open face passages formed in one flat side of a solid block with a cover used for closing the passages.

Figure 12:
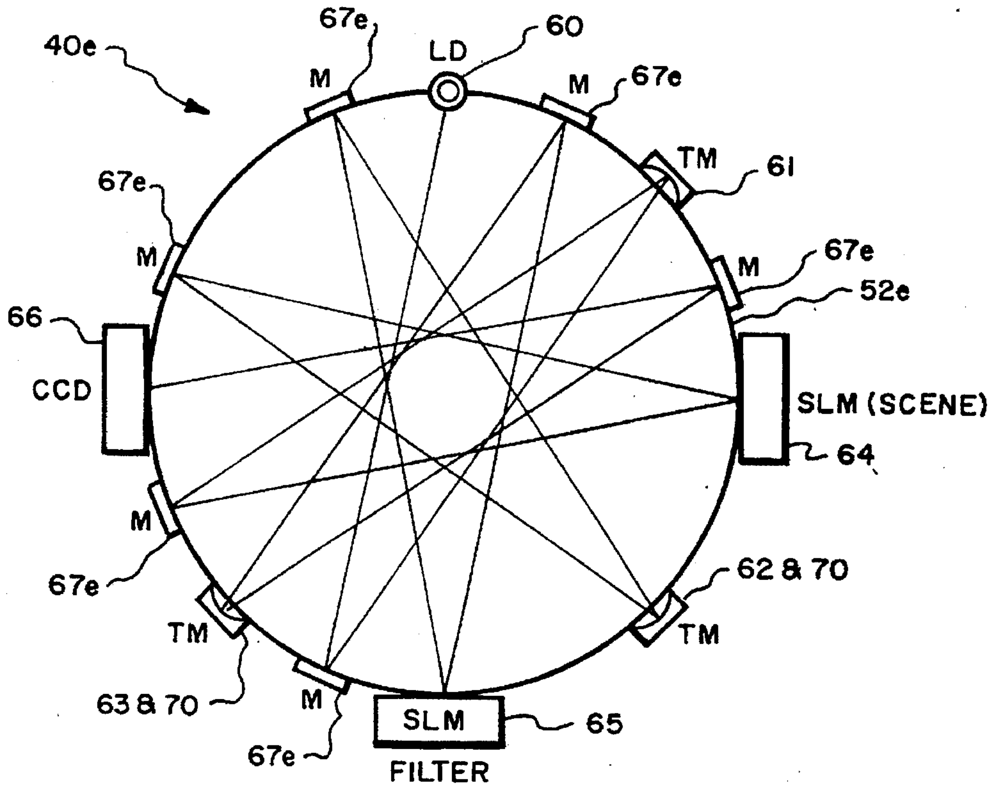
FIG. 12 is a plan view of another embodiment of the module formed as a disc and showing the various components and the folded optical path.
Figure 13:
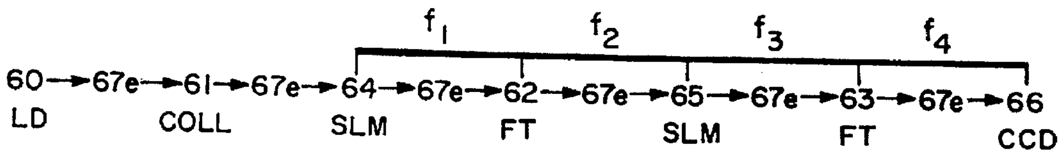
FIG. 13 is a flow chart of the operation and folded optical path of the correlator of FIG. 12.

FIG. 12 shows a correlator 40*e* in the form of a disc 52*e* with the components 60–66 located about its periphery to form the folded light path within the disc 53*e*. Discrete mirrors 67*e* fold the light path additionally to reduce the diameter of the disc 52*e*. This module may be hollow, of a solid transparent media, or of a solid opaque material with passages as described in the previous embodiments. Also, the module may be formed with flats, as by grinding and polishing, to form the mirrors 67*e* on its periphery. This is a 4*f* module and all of the components cooperate as in the previous embodiments so that further description of the folded light path is not needed especially in view of the flow diagram depicted in FIG. 13. Mirrors 61,62 and 63 may be replaced with transmissive optics (lenses or DOEs) to form a "2f" system and although not shown, the polarizers 70 and 71 may be located at or near the SLMs or in their reflected light path at or near flat mirrors 67*e*.

As previously mentioned, the requirement for four focal lengths can be relaxed to one of a shorter geometry by spacing the scene SLM closer to the first Fourier transform lens, correcting the quadratic phase errors so introduced, and by moving the CCD detector array closer to the filter SLM without loss of performance. Such an arrangement is shown schematically in FIG. 14.

Figure 14:
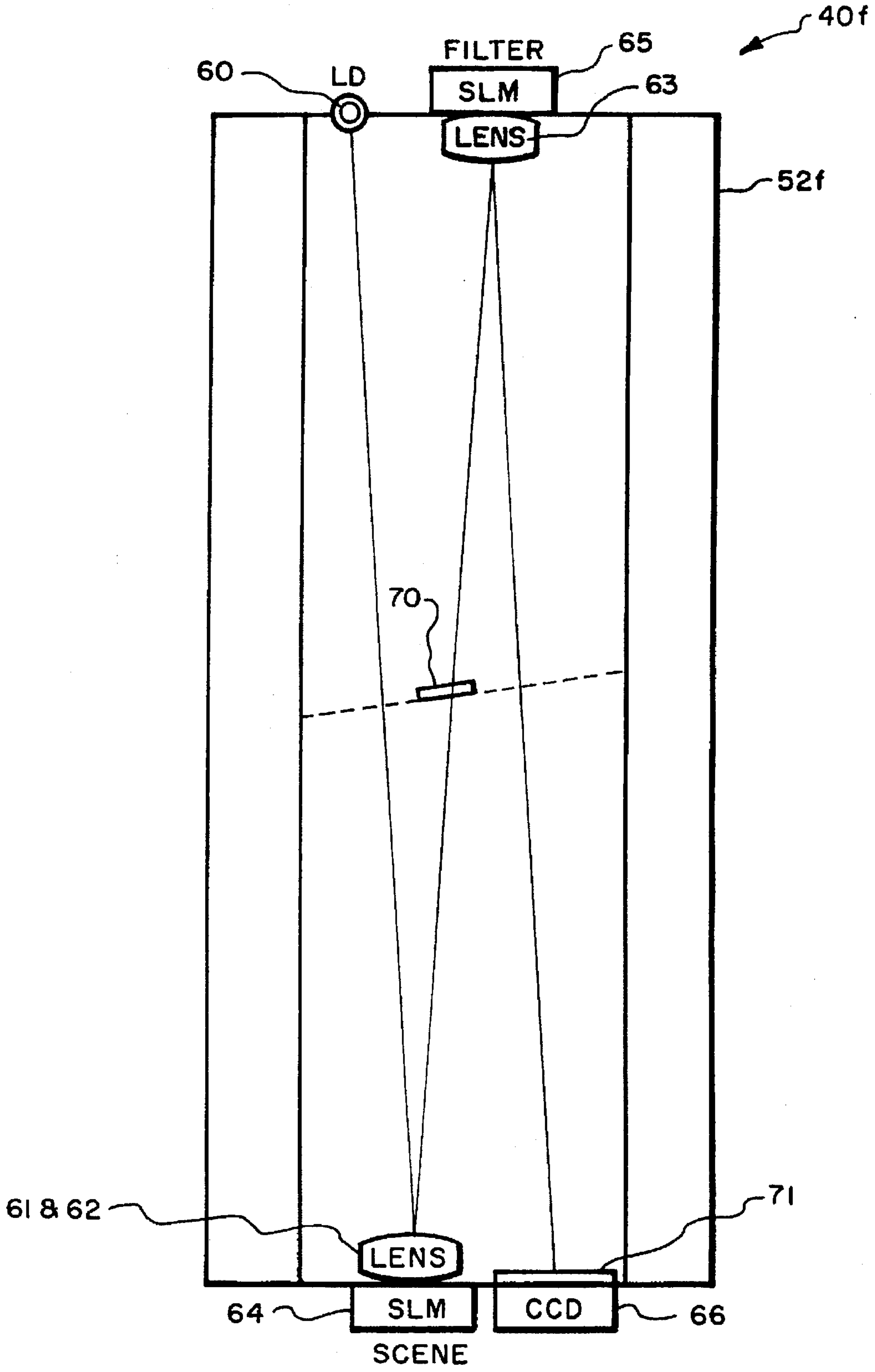
FIG. 14 is a schematic illustration of another embodiment of the correlator with the light path with two folds.

The 2*f* correlator 40*f* of this FIG. 14 shows the laser diode 60 and the filter SLM 64 on the same side of the module 52*f*. The correlation lens 66 (and linearly polarized filter 70) are next to the filter SLM 64 and thus obviously are not one focal length apart. On the bottom side of the module 52*f*, the correlation and Fourier transform lens 62 (and linearly polarized binarizing filter 71) are on the same side with the scene SLM 68 and the CCD detector array 66. Combined lens 61/62 collimates the light from the source 60, then Fourier transforms it after it reflects off of SLM 64. Polarizer 70 converts the reflected beam's modulation from a phase difference imposed on the beam by the SLM's pixels to one of intensity modulation. Lens 63 has minimal optical effect on the light from combined lens 61/62 since it lies so close to the SLM 65. The second polarizer 71 is oriented to select two equal-but-opposite polarizations imposed on the light by the SLM 65 to permit "phase-only" filtering. An alternative orientation will permit "amplitude" filtering (which is generally of inferior performance). Unless an adjustable polarizer is used, one of these two options must be selected at manufacture. This module may be hollow, or of a solid opaque material with passages as described in connection with the previous embodiments or of a transparent media. If the module is hollow, polarizer 70 may be placed in the light path as shown in FIG. 14, but if the module is solid, the module must be sectionalized to accomodate polarizer 70 as illustrated by the dashed line representing the bond line between the two sections. The angle of the bond line accomodates manufacturing tolerances. Alternatively, the combined lens 61/62 and lens 63 may be replaced with DOEs.

Figure 15:
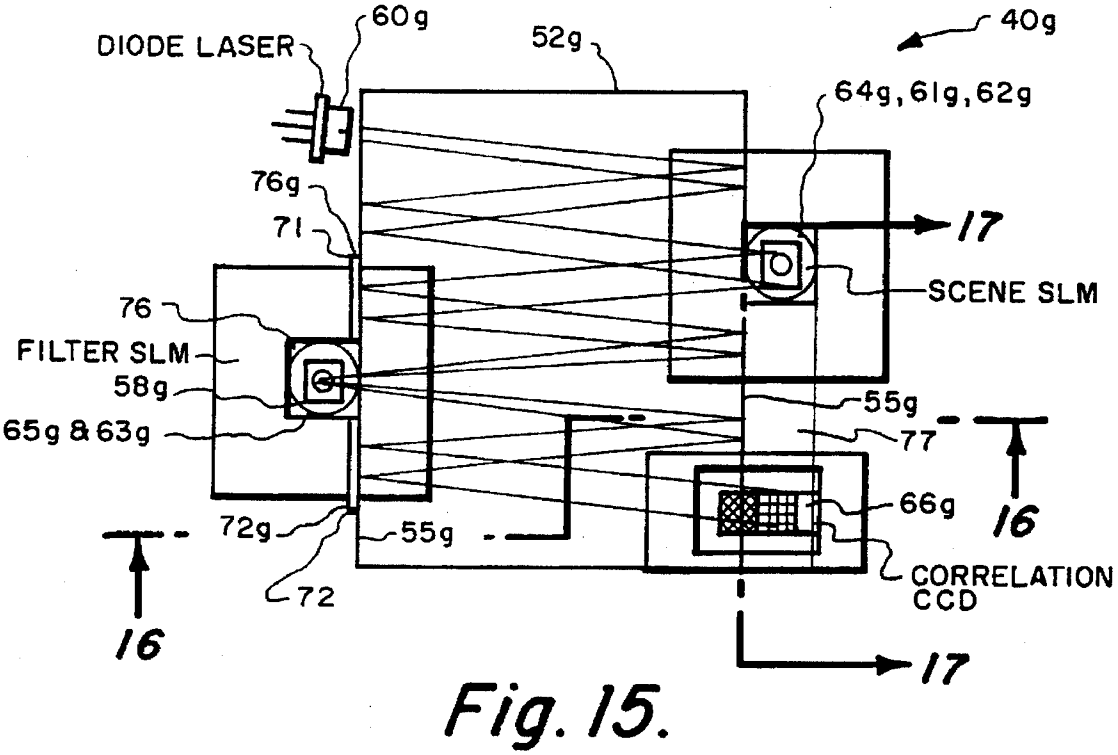
FIG. 15 is a plan view of another embodiment of a correlator formed of transparent media with prisms to accomodate the components and the folded optical path.
Figure 16:
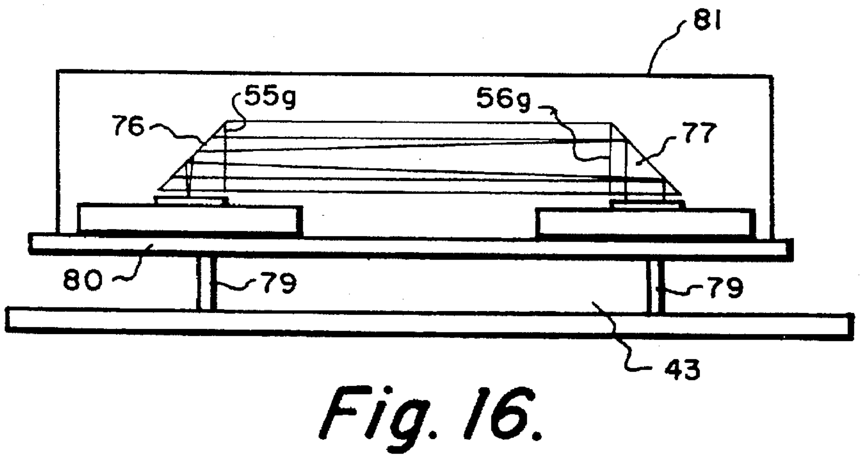
FIG. 16 is a cross-sectional view of the correlator of FIG. 15.
Figure 17:
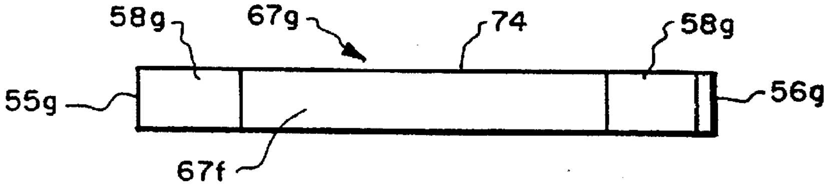
FIG. 17 is a cross-sectional view of the correlator taken along line 17—17 of FIG. 15, FIGS. 18 and 18a are schematic illustrations of another embodiment of the correlator where all of the optical elements in the previous embodiments are formed into one large mirror.

FIG. 15 shows another embodiment of a correlator 40*g* with module 52*g* and the light path similar to that shown in FIG. 14. Edge prisms 76 and 77 engage each side 55*g* and 56*g* of the module 52*g*. Prism 76 is shown square in this plan view to cooperate with the filter SLM 65*g*/lens 63*g* while prism 77 is shown rectangular in this plan view to cooperate with both the scene SLM 64*g*/lens 61*g*, 62*g* and the CCD detector. These prisms deflect the light beams to the SLMs and the CCD detector so that these optical components may be co-planar to each other for mounting purposes as a reduced package heighth as shown in FIG. 16. Reflecting surfaces 67*g* on either the side walls 55*g* and 56*g*, or on the sides of the prisms engaging the side walls 55*g* and 56*g*, are provided to function as the reflecting mirrors, such as 67, as previously described. As shown in FIG. 17, the reflecting mirrors 67*g*, whether on the side walls or on the prisms, are also provided with transparent openings 58*g* to permit the light beams to cooperate with the SLMs and CCD detector so that the correlator operates similarly to that shown in FIG. 14 and the previous figures. Filters 70 and 71 are positioned adjacent the prism 76 to polarize the light beam from the scene and filter SLMs.

FIG. 16 shows the gap 42 (as in FIG. 4) between the correlator 40*g* and the printed circuit board 41 formed by the spacer or spacers 79 attached to a floor 80. If needed, a cover 81 for the correlator 40*g* may be provided and supported on floor 80.

The correlator 40*g* of FIGS. 15–17 utilizing SLMs having ≈30 um square pixels (128×128) is nominally ≈53 mm×63 mm, however utilizing smaller pixel geometries (≈15 μm square) for the SLMs and smaller housings for the SLMs, the correlator can be reduced to nominally one half the size of the correlator as shown in FIGS. 15–17. Pixel geometries ≈15 um will be available for example from. Display Technologies P/N DR 0256 shortly.

Figure 18:
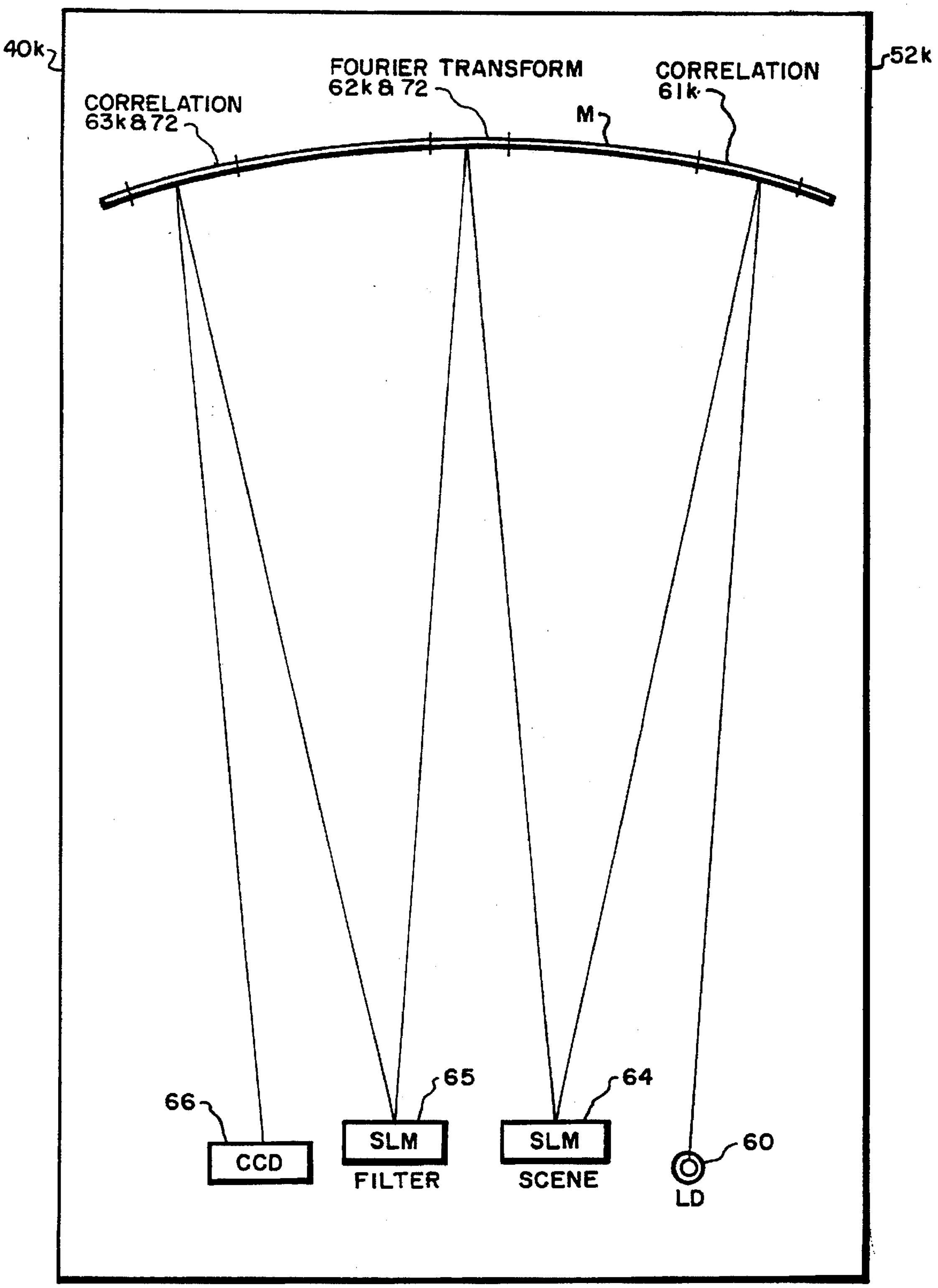
Figure 18A:
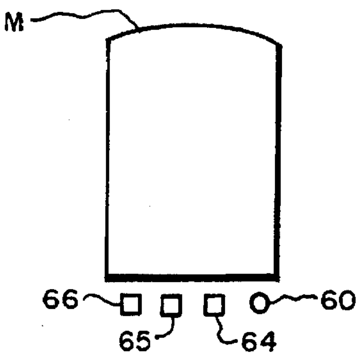

FIG. 18 shows still another correlator 40*k* with one large mirror M at the top of the module 52*k*. This mirror M is optically formed to function as a collimation lens 61*k*, Fourier transform lens 62*k* and correlation lens 63*k* cooperating with the laser diode 60, scene and filter SLMs 64 and 65 and CCD detector 66 located at the focal plane of the large mirror. This correlator can be placed within a module such as 52*k* as a separate optical element or may be a solid module of a transparent media with the mirror M formed on the top surface of the media as shown in FIG. 18*a*.

Figure 19:
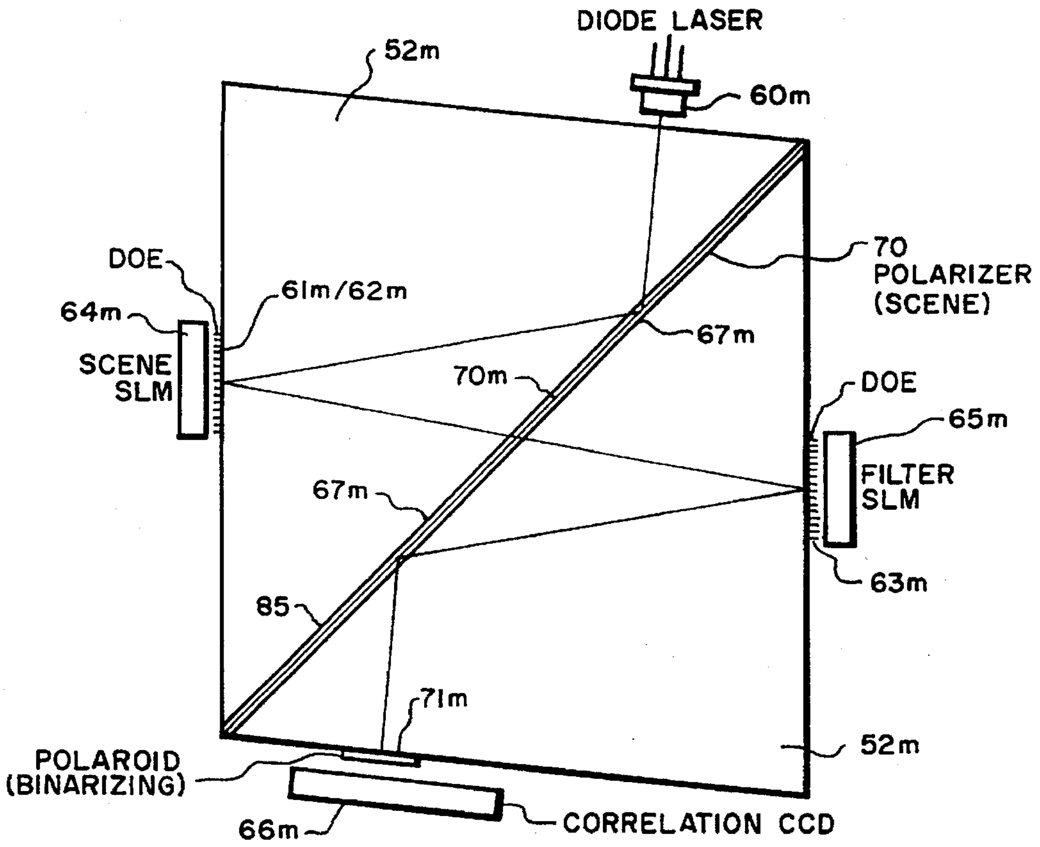
FIG. 19 is a schematic illustration of still another embodiment of the correlator comprising two identical sections of transparent material and the folded light path therein.
Figure 20:
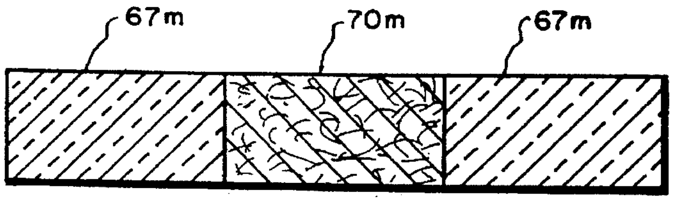
FIG. 20 is a cross-sectional view, taken along line 20—20 of FIG. 19 to show the location of the mirrors and polarizers between the sections of transparent material.

FIG. 19 shows still another correlator 40*m* made of two identical triangular sections 52*m* of transparent material. As shown in FIG. 19, the central interface 85 between the two sections 52*m* is a bond line and one section has been coated to form mirror 67*m* at each end and a polarizing beam splitter (filter) 70*m* as shown in FIG. 20. The translation of the two sections 52*m* with respect to each other accomodates different light paths due to manufacturing tolerances and source wavelength. As shown in this figure, DOEs 61*m*–62*m* are used instead of mirrors and the polarizing filter 70*m* is located at the interface 85 while the binarizing polarizing filter 71*m* is located near the CCD detector 66*m*. This is a 2f system with the calculation of the focal lengths for the Fourier transform optics being the same as before.

Figure 21:
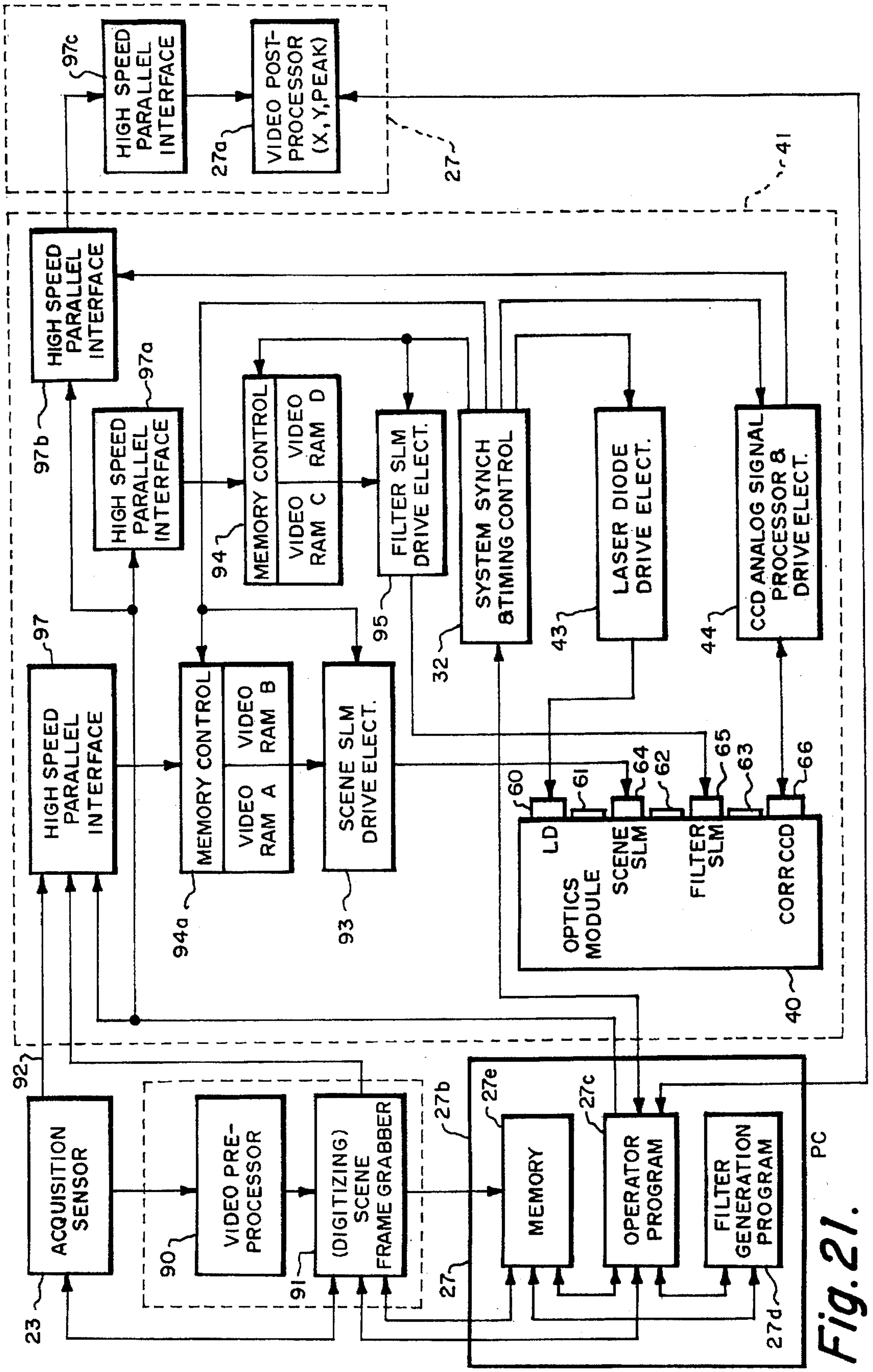
FIG. 21 is a simplified block diagram of the electronics for operating the correlator.

FIG. 21 is a simplified block diagram of the electronic components for the optical correlator, some of which were described and shown on both sides of the printed circuit board 41. In this figure the electronics are shown removed from the printed circuit board for clarity. Sections of diagram within each dotted boundary line reside on a single printed circuit card, and these three cards may or may not all reside inside the PC. Software and memory 27*c*–*e* are indicated as well, and bordered by thick dotted lines.

In this figure, the acquisition sensor 23 is shown coupled to a video preprocessor 90 which is in turn coupled to a digitizing scene frame grabber 91. If the acquisition sensor 23 can internally digitize its output imagery, access to the video preprocessor 90 and frame grabber 91 is not required, and sensor 23 may couple directly to a high speed parallel interface 97 located on the circuit board itself, as indicated by line 92. Otherwise, the input to the correlator 40 is achieved by the connection of the frame grabber 91 to the high speed parallel interface 97.

Frame grabber 91 is also coupled to the processor 27, where software routines may operate on its imagery to save it in memory, input it to the correlator 40 as scene imagery, operate on it to create a filter for the correlator, or have the frame grabber 91 receive another image. The processor is in turn connected to four high speed parallel interfaces 97, 97*a*, 97*b*, and 97*c*, and to the system synch and timing controller 32. These connections enable the user to access the inputs to the scene SLM and filter SLM, and the output of the correlation CCD.

The system synch and timing controller 32 connects to the drive electronics 93 and 95 for the two SLMs, CCD drive electronics 44, and laser diode drive electronics 43. It is responsible for the specific timing commands for these devices so that imagery (scene or filter) is properly updated, the laser strobed after said imagery is completely displayed, and the integration of the correlation signal is performed at CCD 66 during the interval that the laser is on, and data transferred out of CCD 66 when it has finished integrating. Additional timing signals are also sent to the double-buffered video RAM memories for the scene 94*a* and filter 94 SLMs so that the digital imagery temporarily stored therein can be output to their respective SLM drive electronics, 93 and 95, and displayed at SLMs 64 and 65.

The data for each SLM display is a digitized video signal, or equivalent if from another sensor. This data is transferred from the outside world via high speed parallel interfaces, 97 and 97*a*, and temporarily stored in RAM. In order to achieve high frame rates of analysis while allowing for the slower speeds of the display SLMs, it is necessary to store this imagery in paired memory buffers and alternate between which is the active buffer. This occurs in video RAM A and B when many scene images must be analyzed against a few filters, and in video RAM C and D when a single scene is checked against many filters. Memory Controllers in 94*a* and 94 perform this switching operation on their respective video RAM, based on timing signals from the system synch 32.

Each video signal, scene and filter, is output from RAM into its appropriate SLM driver, 93 and 95. Here they are converted into electrical signals that modulate the displays of the SLMs themselves, thus converting them into a visual pattern that can be optically operated on inside the correlator module. The resulting image at the correlation plane is captured by a CCD 66 and sent to a third high speed parallel interface 97*b*. This interface is connected to the processor 27 and a fourth high speed parallel interface 97*c* that couples to a video postprocessor 27*a* where the image is analyzed for correlation signal peaks and their X and Y locations.

We claim:

1. A Vander Lugt optical correlator adapted to form part of a standard commercial printed circuit board capable of being connected into, or with, a personal computer comprising:

means defining a module for accomodating a folded light path, a plurality of optical components positioned to optically communicate with each other, some of which will fold said light beam to form a number of folded light paths, said optical components including, a monochromatic coherent light source internally or externally polarized and positioned to direct its polarized beam through said module, means for receiving and collimating said beam from said light source, scene SLM means comprising an array of pixels each of a predetermined size on the order of 30 um or less and containing target scene information for receiving said collimated beam, for adding said scene information to said collimated beam and for directing said collimated beam containing scene information, a first Fourier transform optic for receiving, linearly polarizing and Fourier transforming said collimated beam containing said scene information and directing said Fourier transformed beam through said module, filter SLM means comprising an array of pixels each of a predetermined size on the order of 30 um or less and target recognition information for receiving said Fourier transformed beam, correlating said scene information and said target recognition information and directing said correlated information out of said filter SLM, said light source, scene SLM and first Fourier transform means together with said filter SLM means forming at least one fold of the light path, a filter Fourier transform optic for receiving said beam containing correlated information from said filter SLM means, linearly polarizing and Fourier transforming said correlated information and directing same through said module, and detector means comprising an array of pixels each of a predetermined size and for receiving said correlated information and generating an electrical signal indicative of correlation, if any, between said scene information and target recognition information, said first and second Fourier transform optics together with said detector means forming at least one of said folded light paths, the length of said folded light path being determined by the size and number of said pixels of said SLM means and detector means and the wavelength of said light from said light source, and the size of said module being determined by the length of said folded light path, the number of said folds and the width of said light beam, thus with the pixel size of 30 um or less and with the source's wavelength is 690 nm–750 nm or shorter and a plurality of folds in said light path, the length and width of said module is less than the length and width of said printed circuit board so that the module can be mounted onto the printed circuit board and will fit within a personal computer and connect directly into a bus slot.

2. The correlator as claimed in claim 1 wherein the number of equivalent focal lengths is two.

3. The correlator as claimed in claim 1 wherein the number of equivalent focal lengths is four.

4. The correlator as claimed in claim 1 wherein said module defines a hollow cavity to accomodate said folded light path.

5. The correlator as claimed in claim 1 wherein said module is opaque and defines the plurality of passage ways to accomodate said folded light path.

6. The correlator as claimed in claim 1 wherein said module is transparent to accomodate said folded light path.

7. The correlator as claimed in claim 1 wherein the formula $$L = \frac{P^2 \cdot N}{\lambda}$$

applies where L is focal length of each of said first and second Fourier transform optics, P is the pitch of the pixels, N is the number of pixels along an edge, λ is the wavelength of the light from the light source, both SLMs have equal pizel sizes and arrays.

8. The correlator as claimed in claim 1 wherein said optical components include reflecting means for reflecting said beam between the other of said optical components.

9. The correlator as claimed in claim 8 wherein prisms are attached to the edges of said module for accomodating said optical components being positioned to function in a plane different from said folded optical path and with said reflecting means being located on the edges of said module.

10. The correlator as claimed in claim 8 wherein said reflecting means is located on one side of said module and all other of said optical components are located on the opposite side of said module.

11. The correlator as claimed in claim 8 wherein said module is in the form of a parallelopiped.

12. The correlator as claimed in claim 8 wherein said reflecting means comprise discrete mirrors.

13. The correlator as claimed in claim 12 wherein said module is in the form of a parallelopiped.

14. The correlator as claimed in claim 12 wherein said module is in the form of a disc.

15. An optical correlator in combination with a standard commercial size printed circuit board capable of being plugged into, or otherwise connected to, the bus slot inside a personal computer comprising, a module mounted on said printed circuit board for the transmission of a light beam in a folded optical path configuration within said module, a plurality of optical components cooperating with said module and optically communicating within said module, reflecting means optically communicating with said optical components, said optical components including, a monochromatic coherent light source internally or externally polarized and positioned to direct its beam at an angle toward said reflecting means, a first optic mounted to receive said beam reflected by said reflecting means to collimate and reflect said beam as a collimated beam toward said reflecting means, a first reflective SLM functioning as an input scene sensor positioned to receive said collimated beam and to add target scene information and to reflect said collimated beam containing said scene information toward said reflecting means, a second optic functioning as a Fourier transform optic positioned to receive said beam from said reflecting means, to linearly polarize said beam and to Fourier transform said beam and reflect said transformed beam toward said reflecting means, a second reflective SLM functioning as a filter and containing target recognition information and positioned to receive said transformed beam and to reflect said beam as a correlation beam containing correlation between said scene information and target recognition information toward said reflecting means, a third optic functioning as a Fourier transform optic positioned to receive said correlation beam, to linearly polarize said correlation beam and reflect said transformed beam toward said reflecting means, and a CCD detector means positioned to receive a correlation beam and identify any correlation between said scene information and said target recognition information, the length of said folded light path being determined by the focal length of said SLMs and detector means and the wavelength of said light, and the size of the module being determined by the length of said folded light path, the number of said folds and the width of said beams accordingly with the above recited pixel size and by selecting the light source with the wavelength in the red or shorter and forming a selected number of folds in the light path, the module length and width is less than the length and width of the printed circuit board so that both the module and the printed circuit board will fit within a personal computer and connect directly into a bus slot.

* * * * *